US012370121B1

(12) United States Patent
Huynh

(10) Patent No.: US 12,370,121 B1
(45) Date of Patent: Jul. 29, 2025

(54) MASSAGE ASSEMBLIES AND METHODS MASSAGING MUSCLE TISSUE

(71) Applicant: Nathan Quang Huynh, Sugar Land, TX (US)

(72) Inventor: Nathan Quang Huynh, Sugar Land, TX (US)

( * ) Notice: Subject to any disclaimer, the term of this patent is extended or adjusted under 35 U.S.C. 154(b) by 764 days.

(21) Appl. No.: 17/522,711

(22) Filed: Nov. 9, 2021

(51) Int. Cl.
*A61H 15/00* (2006.01)

(52) U.S. Cl.
CPC . *A61H 15/0092* (2013.01); *A61H 2015/0014* (2013.01); *A61H 2201/1695* (2013.01); *A61H 2205/12* (2013.01)

(58) Field of Classification Search
CPC ................ A61H 15/00; A61H 15/0092; A61H 2015/0014
USPC .......................................... 601/118–119, 131
See application file for complete search history.

(56) References Cited

U.S. PATENT DOCUMENTS 676,604 A 6/1901 Fritze
3,625,204 A * 12/1971 Sekiguchi .............. A61H 7/003 601/134
4,378,007 A * 3/1983 Kachadourian ........ A61H 15/00 482/79
5,607,749 A * 3/1997 Strumor ............... A43B 13/181 428/313.5
2004/0230139 A1* 11/2004 Chang .................. A43B 1/0054 601/134
2004/0230146 A1* 11/2004 Chang .................... A61H 7/001 601/134
2016/0302994 A1* 10/2016 Chen .................. A61H 23/0254
2021/0128399 A1* 5/2021 Wersland ............... A61H 15/00

FOREIGN PATENT DOCUMENTS

CN 111135067 A * 5/2020
GB 277700 A 3/1928

OTHER PUBLICATIONS

English translation of "CN-111135067-A", May 12, 2020 (Year: 2020).*

* cited by examiner

*Primary Examiner* — Rachel T Sippel
*Assistant Examiner* — Jacqueline M Pinderski
(74) *Attorney, Agent, or Firm* — My Idea Law PLLC; Nathan Q. Huynh

(57) ABSTRACT

Massage assemblies for massaging muscle tissue, in which each massage assembly may include: a housing capable of being rolled, the housing having an aperture; and a core having a portion disposed in the housing; and a stud having: a first stud portion extending through the aperture; and a second stud portion capable of being abutted against the core.

8 Claims, 3 Drawing Sheets

MASSAGE ASSEMBLIES AND METHODS MASSAGING MUSCLE TISSUE

BACKGROUND

1. Field of Inventions

The field of this application and any resulting patent is massage assemblies.

2. Description of Related Art

Various massage assemblies and methods for massaging muscle tissue have been proposed and utilized, including some assemblies and methods disclosed in the prior art references listed in this patent. However, those assemblies and methods lack the combination of features and/or steps of the assemblies and/or methods disclosed and claimed herein. Furthermore, it is contemplated that the assemblies and methods disclosed and claimed herein solve at least certain problems that prior art assemblies and methods have failed to solve.

SUMMARY

The disclosure herein includes massage assemblies, in which each massage assembly may include: a housing capable of being rolled, the housing having an aperture; a stud having: a first stud portion disposed in the aperture; and a second stud portion abutted against the core; and a core having a core portion disposed in the housing, wherein the core portion may be capable of pushing the first stud portion away from the housing.

Additionally, the disclosure herein includes massage assemblies, in which each massage assembly may include: a housing capable of being rolled, the housing having: a first aperture; and a second aperture; a first stud having a first stud portion disposed in the first aperture; a second stud having a second stud portion disposed in the second aperture; and a core having a core portion disposed in the housing, the core portion capable of pushing either the first stud portion or the second stud portion away from the housing.

Furthermore, the disclosure herein includes methods of massaging muscle tissue, in which each method may include providing a massage assembly that may include: a housing; a core having a core portion disposed in the housing; and a first stud having a first stud portion disposed the housing; a second stud having a second stud portion disposed the housing; rolling the housing on muscle tissue; abutting the core against the first stud and the second stud; and pushing either the first stud portion or the second stud portion through the housing against muscle tissue.

DETAILED DESCRIPTION

1. Introduction

Figure 1:
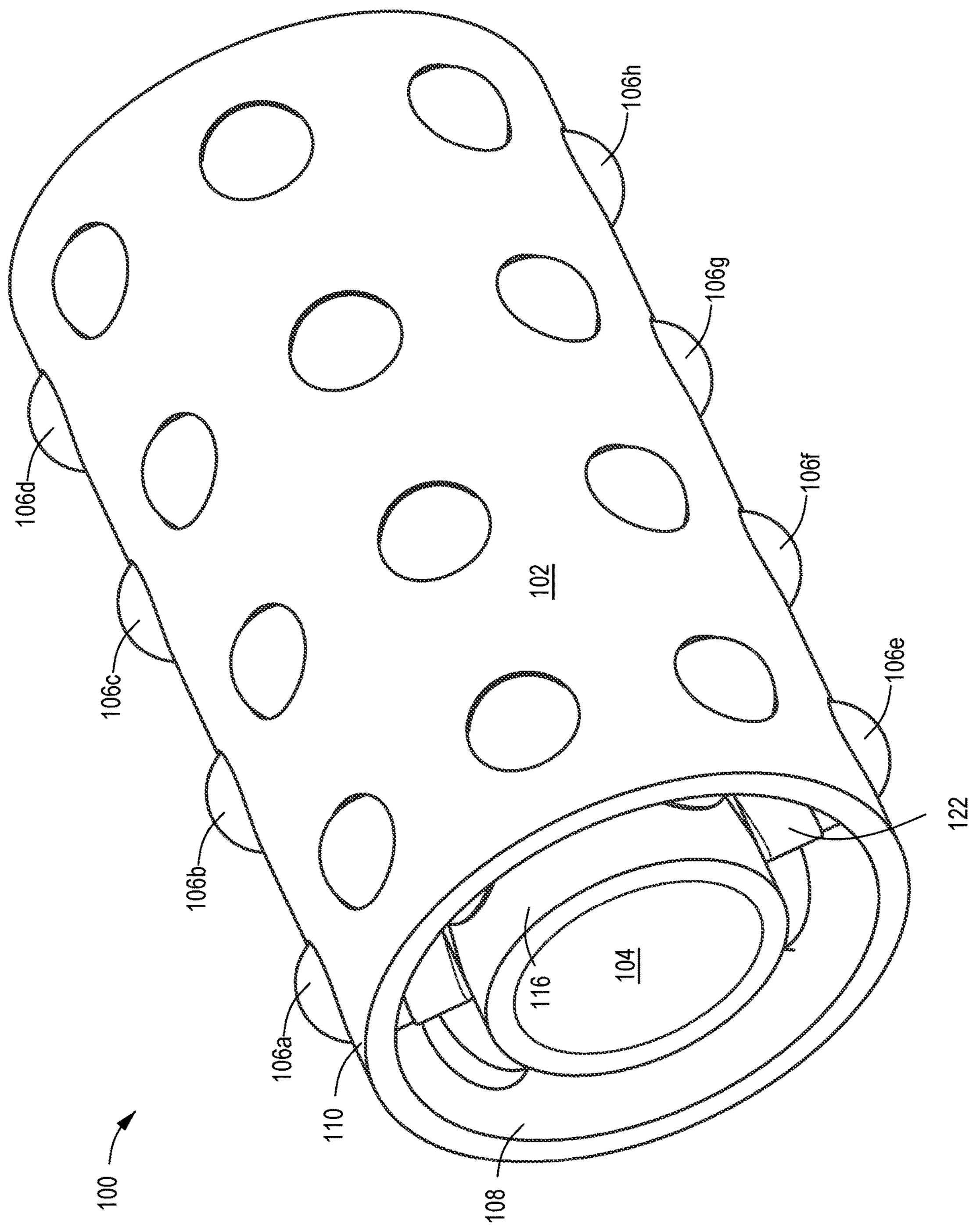
FIG. 1 illustrates a perspective view of a massage assembly.

A detailed description will now be provided. The purpose of this detailed description, which includes the drawings, is to satisfy the statutory requirements of 35 U.S.C. § 112. For example, the detailed description includes a description of inventions defined by the claims and sufficient information that would enable a person having ordinary skill in the art to make and use the inventions. In the figures, like elements are generally indicated by like reference numerals regardless of the view or figure in which the elements appear. The figures are intended to assist the description and to provide a visual representation of certain aspects of the subject matter described herein. The figures are not all necessarily drawn to scale, nor do they show all the structural details, nor do they limit the scope of the claims.

Each of the appended claims defines a separate invention which, for infringement purposes, is recognized as including equivalents of the various elements or limitations specified in the claims. Depending on the context, all references below to the "invention" may in some cases refer to certain specific embodiments only. In other cases, it will be recognized that references to the "invention" will refer to the subject matter recited in one or more, but not necessarily all, of the claims. Each of the inventions will now be described in greater detail below, including specific embodiments, versions, and examples, but the inventions are not limited to these specific embodiments, versions, or examples, which are included to enable a person having ordinary skill in the art to make and use the inventions when the information in this patent is combined with available information and technology. Various terms as used herein are defined below, and the definitions should be adopted when construing the claims that include those terms, except to the extent a different meaning is given within the specification or in express representations to the Patent and Trademark Office (PTO). To the extent a term used in a claim is not defined below or in representations to the PTO, it should be given the broadest definition persons having skill in the art have given that term as reflected in at least one printed publication, dictionary, or issued patent.

2. Selected Definitions

Certain terms used herein are expressly defined below.

The term "abut against" as used herein as a verb is defined as position adjacent to and either physically touch or press against, directly or indirectly. After any abutting takes place with one object relative to another object, the objects may be fully or partially "abutted." For example, a first object may be abutted against a second object such that the second object is limited from moving in a direction of the first object.

The term "align" as used herein is a verb that means manufacture, form, adjust, or arrange one or more physical objects into a particular position. After any aligning takes place, the objects may be fully or partially "aligned." Aligning preferably involves arranging a structure or surface of a structure in linear relation to another structure or surface; for example, such that their borders or perimeters may share a set of parallel tangential lines. In certain instances, the aligned borders or perimeters may share a similar profile. For instance, the surface that defines an aperture of a sidewall of a housing may be aligned with a protrusion of a core. Additionally, apertures may be aligned, such that a structure or portion of a structure may be extended into and/or through the apertures.

The term "aperture" as used herein is defined as any opening in a solid object or structure, e.g., housing, core, and/or sidewall. For example, an aperture may be an opening that begins on one side of a solid object and ends on the other side of the object. An aperture may alternatively be an opening that does not pass entirely through an object, but only partially passes through, e.g., as a groove. An aperture can be an opening in an object that is completely circumscribed, defined, or delimited by the object itself. Alternatively, an aperture can be an opening formed when one object is combined with one or more other objects or structures. An aperture may receive an object, e.g., a stud and/or a protrusion.

The term "assembly" as used herein is defined as any set of components that have been fully or partially assembled together. A group of assemblies may be coupled to form an assembly or a solid structure having an inner surface and an outer surface.

The term "core" as used herein is defined as a structure configured for receiving force from and/or transferring force to another structure, e.g., housing, stud, and/or handle. A core may be coupled to a housing and/or handle. A core may be cylindrical. A core may be planar. A core may be curved. A core may have an inner surface and an outer surface. A core may have an inner surface that is planar. A core may have an inner surface that is curved. A core may have an outer surface that is planar. A core may have an outer surface that is curved. A core may have an outer surface facing an inner surface of a housing. A core may have an outer surface capable of being adjacent to a stud and an aperture of a housing. A core may have a through bore capable of receiving a handle, e.g., rod and shaft.

The term "couple" as used herein is defined as directly or indirectly connect or attach. After any coupling takes place with two or more objects, the objects may be fully or partially "coupled." A first object may be coupled to a second object such that the first object is positioned at a specific location and orientation with respect to the second object. For example, a housing may be coupled to a core. A first object may be either removably, slidably, and/or magnetically coupled to a second object. Two objects may be removably coupled via protrusions, friction, shear pins, threads, tape, rings, hooks, fasteners, locks, male and female connectors, clips, clamps, knots, and/or surface-to-surface contact. For example, a housing and a core may be removably coupled to each other such that the housing may then be uncoupled and removed from the core. Two objects may be slidably coupled, where an aperture of one object may be capable of receiving a second object. For example, a stud slid through an aperture of a housing may be slidably coupled to the housing. Two objects may be magnetically coupled where a first object exerts a magnetic force on a second object that includes ferromagnetic or magnetic material. Magnetically coupled objects are magnetically attracted to each other. For example, a stud including a ferromagnetic portion may be magnetically coupled to a ferrous portion on a core of a massage assembly.

The term "cylindrical" as used herein is defined as shaped like a cylinder having straight parallel sides and a circular or oval or elliptical cross-section. Examples of a cylindrical structure or object may include a housing, a core, and a stud. A cylindrical object may be completely or partially shaped like a cylinder. Alternatively, a solid cylindrical object may have an inner surface or outer surface having a diameter that changes abruptly. A cylindrical object may have an inner or outer surface having a diameter that changes abruptly to form a collar, e.g., flange, radial housing, rim, or lip. A cylindrical object may have a surface forming a collar extending toward or away from the central axis of the object. A cylindrical object may have an inner surface forming a collar disposed thereon. A cylindrical object may have an outer surface forming an outer collar disposed thereon. A cylindrical object may have an outer collar having a first outer surface and a second outer surface, in which the first outer surface has a first diameter greater than a second diameter of the second surface. For example, a stud may have a collar extending outwardly therefrom. A first diameter of the collar may be greater than a second diameter of an outer surface of the stud. Additionally, a cylindrical object, may have an outer surface that is tapered or radiused.

The term "housing" as used herein is defined as a structure configured for coupling to a second structure, e.g., a core and/or a stud. A housing may have an inner surface and an outer surface. A housing may have an inner surface disposed adjacent to an outer surface of a core. One or more objects, e.g., studs and/or protrusions, may extend through the housing. A housing may have a body and one or more sidewalls. A housing may have a planar inner surface. A housing may have a planar outer surface. A housing may be curved. A housing may be cylindrical. One or more apertures may extend through the housing. A surface defining an aperture through a housing may have a frustoconical portion, e.g., tapered or radiused portion. A housing may be removably coupled to a core. A housing may be removably coupled to protrusions of a core. A housing may have one or more sidewalls. A housing may have one or more apertures extending therethrough. An aperture extended through a housing may have a tapered cross-section. An object, e.g., stud, may extend through an aperture of the housing.

The terms "first" and "second" as used herein merely differentiate two or more things or actions, and do not signify anything else, including order of importance, sequence, etc.

The term "groove" as used herein is defined as an indentation in a surface. A groove may extend in a straight line from one end to another. A groove may be a continuous loop, e.g., around a cylindrical structure. One or more grooves may be formed on an outer surface of an object to form pin grooves. One or more grooves may be formed on the inner surface of an object to form box grooves. A groove may extend in a meandering path from an end to another, e.g., a S-shaped or C-shaped path. A groove may have a cross-section that is V-shaped. A groove may have a cross-section that is rectangular. A groove may have a cross-section that is arcuate, e.g., U-shaped.

The terms "he," "she," "they," and any other personal pronouns as used herein refer to any gender interchangeably. For example, all uses of "he" encompasses "she" as well.

The term "obround" as used herein is defined as having a shape consisting of two semicircles connected by parallel lines tangent to their endpoints.

The term "perpendicular" as used herein is defined as at an angle ranging from 85° or 88 to 92° or 95°, e.g., to a line, a plane, or a surface. Two structures that are perpendicular to each other may be orthogonal and/or tangential to each other.

The term "providing" as used herein is defined as making available, furnishing, supplying, equipping, or causing to be placed in position.

The term "protrusion" as used herein is defined as a structure extending from an object or structure. A protrusion may be received in an aperture. For example, a core may have one or more protrusions extending from a surface of the core. A housing may have one or more protrusions extending from a surface of the housing. A protrusion may be received in an aperture. A protrusion may have a portion covered by elastic and/or resilient material, e.g., rubber, plastic, and/or silicone. A protrusion may have a radiused profile, e.g., surface. A protrusion may be tapered.

The term "pushing" as used herein is a verb is defined as applying force towards an object or structure. Pushing may compel, e.g., urge, cause, compel, influence, force, and/or press, displacement of an object. A first object, having received force from a source, may push another object by transferring the force to the second object, directly or indirectly. For example, a stud having received force from the ground would push a core by transferring the force to the core, directly or indirectly. A first object may directly push a second object where the objects physically touched. A first object may indirectly push a second object via magnetism or electromagnetism. A first object may indirectly push a second object via physical contact with a medium, e.g., where the medium may be disposed between the first object and the second object. A medium may include silicone, rubber, and foam. After any pushing takes place, the object may be "pushed." A pushed object may separate from the thing pushing it. A pushed object may remain in its original position. An object may be pushed a distance towards or away from another object.

The term "radiused" as used herein is defined as having a contour that is curved, semicircle, and/or hemispherical. A radiused surface may be concave or convex. A radiused surface may be a spherical cap.

The term "separate" as used herein as a verb is defined as move apart. A first object separated from a second object may have more distance or space between them than before they were separated.

The term "sidewall" as used herein is defined as any structure having a planar surface. The sidewall may be a flat plate, e.g., disc. A sidewall may be cylindrical. A sidewall may be continuous. A sidewall may be solid. A sidewall may have curved planar sides that may or, in some cases, may not be parallel to one another. A sidewall may be rigid. A sidewall may be flexible. A sidewall may be planar. A sidewall may have a plane that is perpendicular to a body of a housing. A sidewall may be curved. A sidewall may be disposed at an end of a body of a housing. A sidewall may have a surface that is parallel to a side surface of a core. A sidewall may have one or more apertures. A sidewall may have one or more apertures disposed therethrough. A sidewall may have an aperture configured to receive a stud.

The term "spherical cap" as used herein is defined as a portion of a sphere cut off by a plane. Spherical cap may also be referred to as a spherical dome or a spherical segment. A stud may have a portion having a profile of spherical cap.

The term "stud" as used herein is defined as a structure configured to receive force from an object, e.g., another stud and/or a core. A stud may be rigid. A stud may be elastic and/or flexible. A stud may be constructed from various materials including rubber, plastic, silicone, carbon fiber, ceramic, wood, plant fiber, cotton, and/or metal. A stud may have a portion that protrudes, e.g., extend, rise, and/or elevate, from a surface of an object, e.g., housing and/or core. A stud may have a portion that is radiused. A stud may have portion that is convex. A stud may have portion that is concave.

The term "surface" as used herein is defined as any boundary of a structure. A surface may also refer to that flat or substantially flat area that is extended radially around a cylindrical structure which may, for example, be part of a housing, a stud, or a handle. A surface may also refer to that flat or substantially flat area that extend radially around a cylindrical structure or object which may, for example, be part of a housing, a core, a handle, and/or a stud. A surface may have irregular contours. A surface may be formed from coupled components, e.g., a housing, stud, and/or a core. Coupled components may form irregular surfaces. A plurality of surfaces may be connected to form a polygonal cross-section. An example of a polygonal cross-section may be triangular, square, rectangular, pentagonal, hexagonal, or octagonal.

The term "tapered" as used herein is defined as having a surface and/or profile defining a set of circumferences that becomes progressively smaller from a first end to a second end. Structures that are tapered may have a profile that is beveled, triangular, frustoconical, and/or conical.

The term "transfer" as used herein as a verb is defined as cause, directly or indirectly, to convey, e.g., pass, shift, or move, something, e.g., from a first object and/or position to a second object and/or position. A first object may receive force from a source, e.g., a human body part, and then transfers the force to a second object. For example, a stud may receive force from a human foot and may then transfer the force to a core and/or to another stud. A thing that can be "transferred" may include any object, structure, energy, pressure, vibration, force, push, or pull. For example, force may be transferred, directly or indirectly, from a first stud to a second stud. Force may be directly transferred from a source, e.g., human foot or hand, to a first object, e.g., stud or housing, to a second object, e.g., stud or core, via physical contact of the first object with the second object. Force may be indirectly transferred from a source to a first object to a second object via a medium, e.g., core, disposed between the first object and the second object.

The term "unitary" as used herein is defined as having the nature, properties, or characteristics of a single unit. A stud that is an individual part may be unitary with a collar in the sense they are not separate but rather are formed from a single piece of material, e.g., silicone, plastic, nylon, carbon fiber, fiber glass, ceramic, wood, or metal.

The terms "upper," "lower," "top," "bottom", "front", "back" as used herein are relative terms describing the position of one object, thing, or point positioned in its intended useful position, relative to some other object, thing, or point also positioned in its intended useful position, when the objects, things, or points are compared to distance from the center of the earth. The term "upper" identifies any object or part of a particular object that is farther away from the center of the earth than some other object or part of that particular object, when the objects are positioned in their intended useful positions. The term "lower" identifies any object or part of a particular object that is closer to the center of the earth than some other object or part of that particular object, when the objects are positioned in their intended useful positions. For example, a housing, a core, a neck, a core, a sidewall, and a stud may each have an upper end and a lower end. The term "top" as used herein means in the highest position, e.g., farthest from the ground. The term "bottom" as used herein means in the lowest position, e.g., closest the ground. For example, a cylindrical object, e.g., a housing, a core, a neck, a core, a sidewall, and a stud, may have a top portion and a bottom portion. The term "front" identifies any object or part of a particular object that is closest to a person viewing the object. The term "back" identifies any object or part of a particular object that is closest to a person viewing the object.

3. Certain Specific Embodiments

The disclosure herein includes massage assemblies, in which each massage assembly may include: a housing capable of being rolled, the housing having an aperture; a stud having: a first stud portion disposed in the aperture; and a second stud portion abutted against the core; and a core having a core portion disposed in the housing, wherein the core portion may be capable of pushing the first stud portion away from the housing.

Additionally, the disclosure herein includes massage assemblies, in which each massage assembly may include: a housing capable of being rolled, the housing having: a first aperture; and a second aperture; a first stud having a first stud portion disposed in the first aperture; a second stud having a second stud portion disposed in the second aperture; and a core having a core portion disposed in the housing, the core portion capable of pushing either the first stud portion or the second stud portion away from the housing.

Furthermore, the disclosure herein includes methods of massaging muscle tissue, in which each method may include providing a massage assembly that may include: a housing; a core having a core portion disposed in the housing; and a first stud having a first stud portion disposed the housing; a second stud having a second stud portion disposed the housing; rolling the housing on muscle tissue; abutting the core against the first stud and the second stud; and pushing either the first stud portion or the second stud portion through the housing against muscle tissue.

In any one of the methods or structures disclosed herein, pushing the core with the first stud may push the second stud.

In any one of the methods or structures disclosed herein, pushing the core with the second stud may push the first stud.

In any one of the methods or structures disclosed herein, the core may be capable of being abutted against the housing.

In any one of the methods or structures disclosed herein, the core may be capable of being abutted against the housing.

In any one of the methods or structures disclosed herein, the core portion may be capable of being rolled in a surface of the second stud portion.

In any one of the methods or structures disclosed herein, the core may be capable of being moved radially relative to the housing.

In any one of the methods or structures disclosed herein, the stud may be capable of being moved radially relative to the housing.

In any one of the methods or structures disclosed herein, the core and the stud may be capable of being moved radially relative to the housing.

In any one of the methods or structures disclosed herein, the core portion may be capable of pushing the first stud portion out of the first aperture.

In any one of the methods or structures disclosed herein, the core portion may be capable of pushing the second stud portion out of the second aperture.

In any one of the methods or structures disclosed herein, the second stud portion may be disposed between the housing and the core.

In any one of the methods or structures disclosed herein, the second stud portion may be disposed between the housing and the core.

In any one of the methods or structures disclosed herein, the second stud portion may a collar.

In any one of the methods or structures disclosed herein, the first stud portion may have a first diameter smaller than a second diameter of the second stud portion.

In any one of the methods or structures disclosed herein, the stud may be capable of being separated from the core by a distance.

In any one of the methods or structures disclosed herein, the second stud portion may be capable of being separated from the core by a distance.

In any one of the methods or structures disclosed herein, the stud may further include a collar capable of being abutted against the housing.

In any one of the methods or structures disclosed herein, the second stud may be capable of pushing the core and the first stud.

In any one of the methods or structures disclosed herein, the second stud may be capable of pushing the core and the first stud.

In any one of the methods or structures disclosed herein, the first stud and the second stud share a first central axis that may be perpendicular to a second central axis of the core.

In any one of the methods or structures disclosed herein, the core portion may be capable of being rolled in a surface of the stud or a surface of the second stud.

In any one of the methods or structures disclosed herein, a portion of the first stud and a portion of the second stud may be disposed between the housing and the core.

In any one of the methods or structures disclosed herein, the first stud portion and the second stud may be capable of being separated from the core by a distance.

Any one of the methods or structures disclosed herein further including separating the core from the first stud, the second stud, or both by a distance.

Any one of the methods or structures disclosed herein further including abutting the core against the housing.

Any one of the methods or structures disclosed herein further including abutting a collar of the stud against the core.

4. Specific Embodiments in the Drawings

The drawings presented herein are for illustrative purposes only and do not limit the scope of the disclosure. Rather, the drawings are intended to help enable one having ordinary skill in the art to make and use the assemblies disclosed herein.

This section addresses specific versions of massage assemblies shown in the drawings, which relate to assemblies, elements and parts that can be part of a massage assembly. Although this section focuses on the drawings herein, and the specific embodiments found in those drawings, parts of this section may also have applicability to other embodiments not shown in the drawings. The limitations referenced in this section should not be used to limit the scope of the claims themselves, which have broader applicability.

Figure 2:
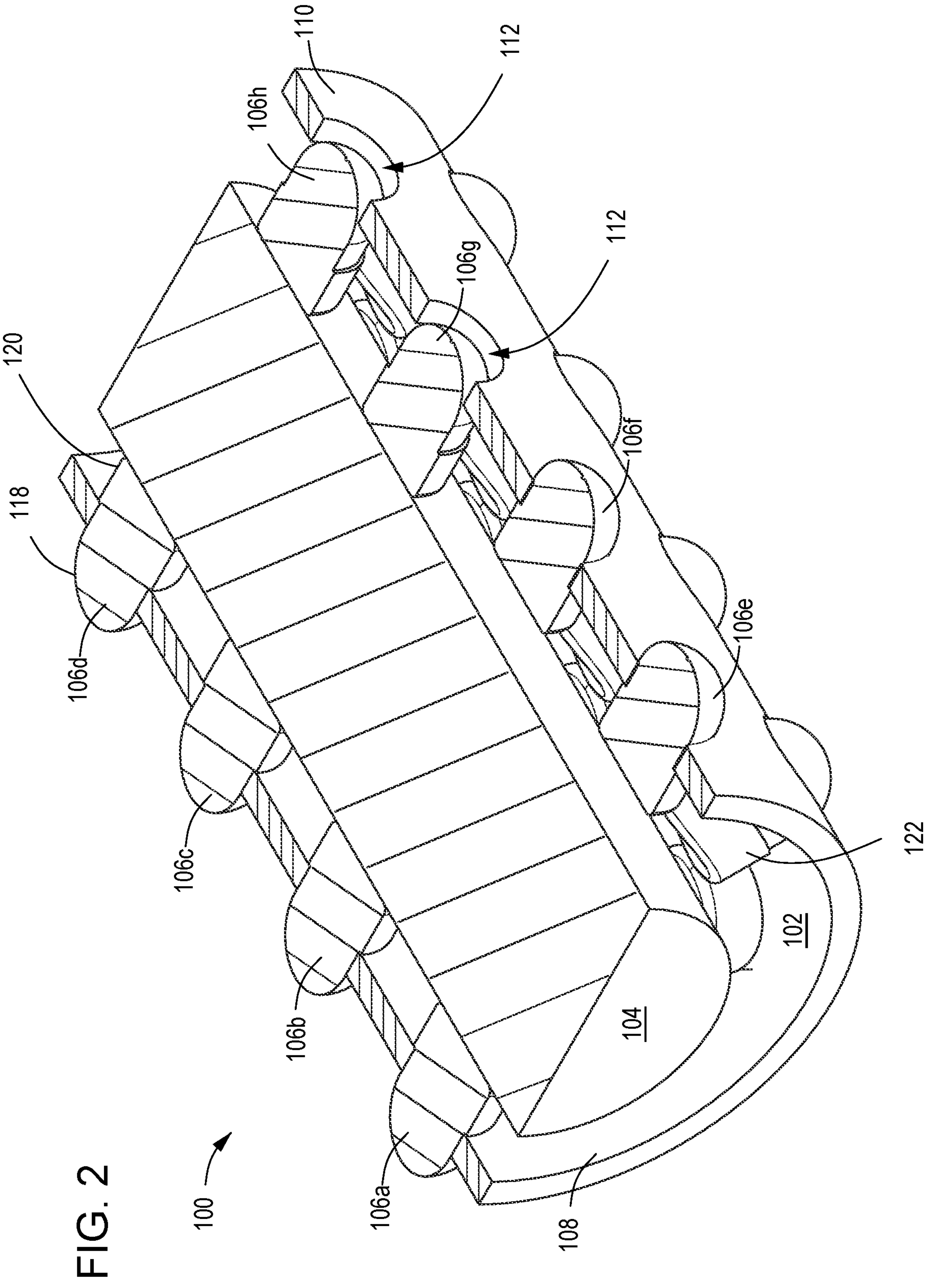
FIG. 2 illustrates a cross-sectional perspective side view of a massage assembly.
Figure 3:
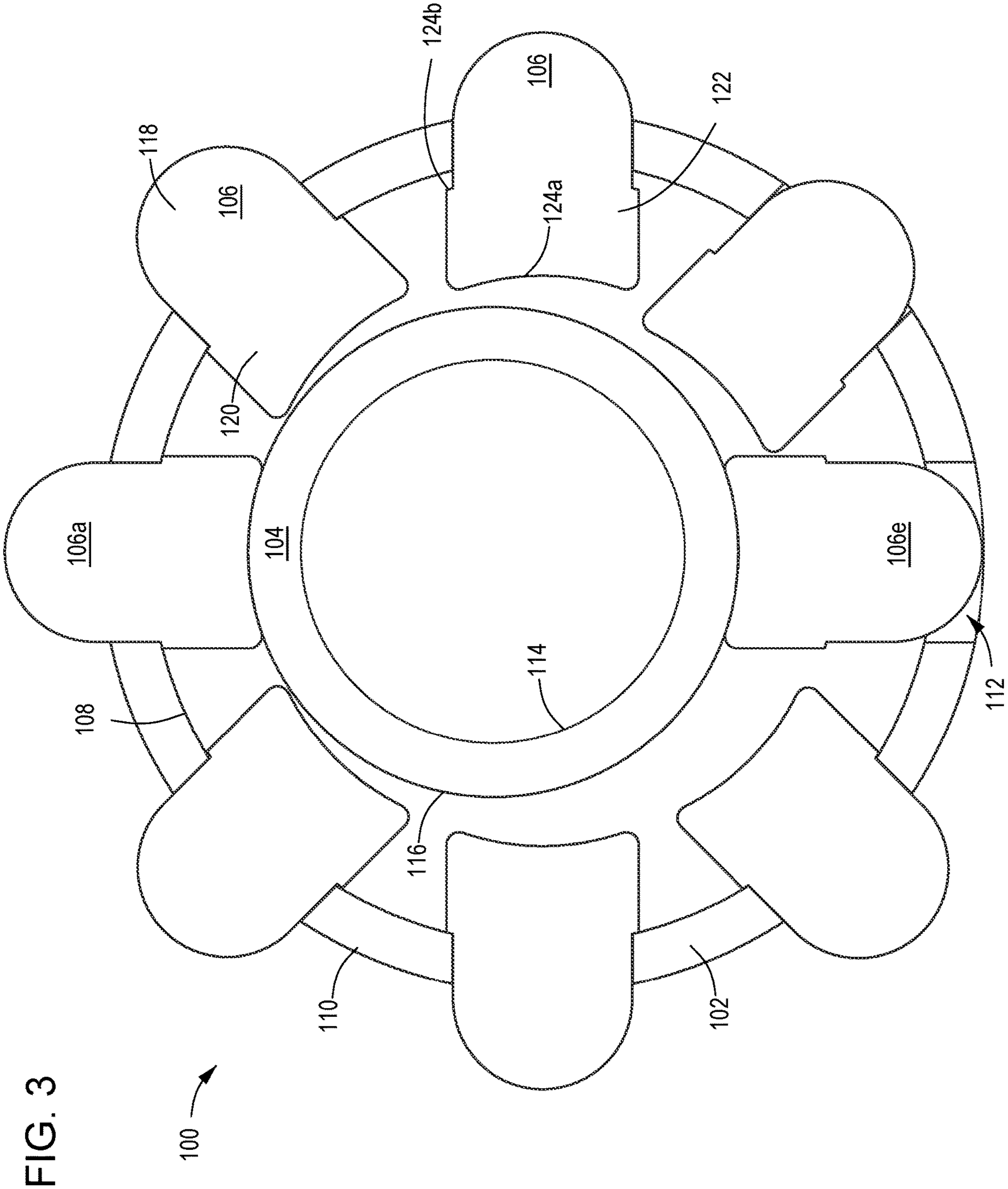
FIG. 3 illustrates a cross-sectional plan view of a massage assembly.

FIG. 1 illustrates a perspective view of a massage assembly 100 including a housing 102, a core 104, and studs 106. FIG. 2 illustrates a cross-sectional view of a massage assembly 100 including a housing 102, a core 104, and studs 106. FIG. 3 illustrates a cross-sectional plan view of a massage assembly.

Referring to FIGS. 1-3, a massage assembly 100 may include the housing 102, the core 104, and studs 106*a-h*. The housing 102 may be cylindrical. The housing 102 may have an inner surface 108 and an outer surface 110. Additionally, the housing 102 may have one or more apertures 112 extending through the inner surface 108 and the outer surface 110 (see FIG. 1A and FIG. 2A). A first portion 118 of a stud 106 may extend through the aperture 112.

The core 104 may be disposed in the housing 102. The core 104 and the housing 102 may be concentric. In addition, the core 104 may cylindrical. The core 104 may have an inner surface 114 and outer surface 116.

The studs 106*a-h* may each have a portion extending through the respective apertures 112 of the housing 102. A height of each stud 106 plus a radius of the core 104 plus a thickness of a side wall of the housing 102 together may equal a radius of the outer surface 110 of the housing 102.

In addition, each stud 106 may include a first portion 118 and a second portion 120. The first portion 118 and the second portion 120 may be unitary. The first portion 118 may be spherical. Preferably, the first portion 118 may have an end that is a spherical cap. The second portion 120 may extend from the first portion 118. A collar 122 may extend radially from the second portion 120. The collar 122 may be disposed between the inner surface 108 of the housing 102 and the outer surface 116 of the core 104. The collar 122 may be abutted against the outer surface 116 of the core 102. The collar 122 may be abutted against the inner surface 108 of the housing 102. Thus, in some cases, the collar 122 may inhibit the stud 106 from egress through a respective aperture 112 of the housing 102.

The second portion 120 of the stud 104 may have an end having a lower curved surface 124*a*. The lower curved surface 124*a* may have an arc having a radius congruent to the radius of the outer surface 116 of core 104.

Additionally, the collar 122 may have an upper curved surface 124*b*. The upper curved surface 124*b* may have an arc having a radius congruent to the radius of the inner surface 108 of core housing 102.

Referring to FIGS. 1-3, a person may operate a massage assembly 100 as follow to massage or more parts of his or her body. First, the person may dispose the massage assembly 100 on the ground.

The person may then position a foot, for example, on a housing 102 and/or studs 106*a-h* of the massage assembly 100. Depending on the contour of the person's foot, surfaces of foot may push against outer surfaces of the housing 102 and some studs 106. Accordingly, the housing 102 and/or some studs 106 may be pushed towards the ground.

Next, the person may roll the housing 102 back and forth by moving his or her foot back and forth. As the housing 102 is rolled, the foot may push portions of the studs 106*a-d* through the housing 102. The studs 106*a-d* may push against a core 104. The pushed core 104 may roll along surfaces of the stud 104. In turn, the core 104 may push portions of the studs 106*e-h* through the housing 102. The studs 106*e-h* may be abutted against the ground. Accordingly, the core 104 and the studs 106*a-h* would resist the downward force applied by the foot. Thus, pressured would be applied to portions of the foot that are pushing against the studs 106*a-d*, thereby massaging the foot.

What is claimed as the invention is:

1. A massage assembly, comprising:
a housing capable of being rolled, the housing having:
a first aperture; and
a second aperture;
a first stud having a first stud portion disposed in the first aperture, wherein the first stud portion has a first spherical cap;
a second stud having a second stud portion disposed in the second aperture, wherein the second stud portion has a second spherical cap; and
a core having a core portion disposed in the housing, the core portion is capable of pushing either the first spherical cap or the second spherical cap away from the housing;
wherein the second stud is capable of pushing the core and the first stud; and
wherein the first stud and the second stud are capable of being separated from any portion of the core by a distance.

2. The massage assembly of claim 1, wherein the core portion is capable of pushing the first stud portion out of the first aperture.

3. The massage assembly of claim 1, wherein the core portion is capable of pushing the second stud portion out of the second aperture.

4. The massage assembly of claim 1, wherein the core portion is capable of being rolled on a surface of the first stud or a surface of the second stud.

5. The massage assembly of claim 1, wherein the first stud and the second stud are both partially disposed between the housing and the core.

6. A method of massaging muscle tissue, comprising:
providing a massage assembly, comprising:
a housing;
a core having a core portion disposed in the housing; and
a first stud having a first stud portion that has a spherical cap;
a second stud having a second stud portion disposed in the housing;
rolling the housing on muscle tissue;
pushing the core and the first stud with the second stud;
pushing the first stud portion through the housing and the spherical cap against the muscle tissue; and
separating any portion of the core from the first stud, the second stud, or both by a distance.

7. The massage assembly of claim 6, further comprising abutting the core against the housing.

8. The massage assembly of claim 6, further comprising abutting a collar of the first stud against the core.

* * * * *